United States Patent
Baikalov et al.

(10) Patent No.: US 9,973,904 B2
(45) Date of Patent: May 15, 2018

(54) MATRIX ACCESS REVIEW

(71) Applicant: Bank of America Corporation, Charlotte, NC (US)

(72) Inventors: Igor A. Baikalov, Thousand Oaks, CA (US); Armen Moloian, Crest Park, CA (US); David Pritchard, London (GB)

(73) Assignee: Bank of America Corporation, Charlotte, NC (US)

( * ) Notice: Subject to any disclaimer, the term of this patent is extended or adjusted under 35 U.S.C. 154(b) by 564 days.

(21) Appl. No.: 14/486,066

(22) Filed: Sep. 15, 2014

(65) Prior Publication Data
US 2016/0080224 A1 Mar. 17, 2016

(51) Int. Cl.
*G06F 3/14* (2006.01)
*H04W 4/08* (2009.01)

(52) U.S. Cl.
CPC ..................... *H04W 4/08* (2013.01)

(58) Field of Classification Search
CPC ..................... G06F 3/14; G06F 3/17
USPC .............. 715/835; 726/4; 707/783; 705/7.14
See application file for complete search history.

(56) References Cited

U.S. PATENT DOCUMENTS

| | | | |
|---|---|---|---|
| 8,418,229 B2 | 4/2013 | Baikalov et al. | |
| 2005/0055573 A1* | 3/2005 | Smith | G06F 21/6218 726/4 |
| 2012/0046989 A1 | 2/2012 | Baikalov et al. | |
| 2012/0240193 A1* | 9/2012 | Littlefield | G06F 21/604 726/4 |
| 2013/0304763 A1* | 11/2013 | Esposito | G06F 17/30 707/783 |
| 2014/0129273 A1* | 5/2014 | Versteeg | G06F 17/30286 705/7.14 |

* cited by examiner

*Primary Examiner* — Ruay Ho
(74) *Attorney, Agent, or Firm* — Banner & Witcoff, Ltd.; Michael A. Springs

(57) ABSTRACT

A computing platform may receive, from a plurality of computing systems, data identifying permissions of a plurality of users to access one or more resources of the plurality of computing systems. The computing platform may identify, from amongst the plurality of users, a plurality of groups of users. The computing platform may identify, from amongst the permissions, a plurality of sets of permissions. Each set of permissions may include permissions shared by each user of a group of users of the plurality of groups of users. The computing platform may generate a graphical depiction of the plurality of groups of users and the plurality of sets of permissions. The graphical depiction may graphically depict, for each group of the plurality of groups, one or more sets of permissions, of the plurality of sets of permissions, shared by each user of the group.

18 Claims, 6 Drawing Sheets

| Matrix Access Review Report | | | Mgr. #1 | | | | | Mgr. #2 | | | | | Mgr. #3 | | | |
|---|---|---|---|---|---|---|---|---|---|---|---|---|---|---|---|---|
| Month ##, 20## | | | Self | User 1 | User 2 | User 3 | User 4 | Self | User 5 | User 6 | User 7 | User 8 | Self | User 9 | User 10 | User 11 | User 12 |
| Resource | Permission | Task | | | | | | | | | | | | | | | |
| A-1 | Type #1 | #1 | X | X | X | X | X | X | X | X | X | X | X | X | X | X | X |
| A-2 | Type #1 | #1 | X | X | X | X | X | X | X | X | X | X | X | X | X | X | X |
| B-2 | Type #1 | #2 | | | | | | | | | | | | X | | X | X |
| C-1 | Type #1 | #2 | | | | | | | X | | | | | X | | X | X |
| A-n | Type #1 | #2 | | | | | | | | | | | | X | | X | X |
| C-2 | Type #2 | #3 | X | X | X | X | X | | | | | | | | | | |
| C-n | Type #1 | #3 | X | X | X | | X | | | | | | | | | | |
| B-1 | Type #1 | #4 | | | X | X | | | X | X | | | | X | X | | |
| A-1 | Type #2 | #4 | | | X | X | | | X | X | | | | X | X | | |
| C-2 | Type #1 | N/A | X | | | | | | | | | | | | X | | |
| B-n | Type #1 | N/A | X | | | X | | X | | | | X | | | | | |
| A-1 | Type #3 | N/A | | | | | | | | | | X | | | | | |

Matrix Access Review Report

Month ##, 20##

| Resource | Permission | Task | Mgr. #1 | | | | | Mgr. #2 | | | | | Mgr. #3 | | | | |
|---|---|---|---|---|---|---|---|---|---|---|---|---|---|---|---|---|---|
| | | | Self | User 1 | User 2 | User 3 | User 4 | Self | User 5 | User 6 | User 7 | User 8 | Self | User 9 | User 10 | User 11 | User 12 |
| A-1 | Type #1 | #1 | X | X | X | X | X | X | X | X | X | X | X | X | X | X | X |
| A-2 | Type #1 | #1 | X | X | X | X | X | X | X | X | X | X | X | X | X | X | X |
| B-2 | Type #1 | #2 | | X | X | | | | X | | | | | X | – | X | X |
| C-1 | Type #1 | #2 | | | | | | | X | | | | | X | – | X | X |
| A-n | Type #1 | #2 | | | | | | | | | | | | X | | X | X |
| C-2 | Type #2 | #3 | X | X | X | X | X | | | | | | | | | | |
| C-n | Type #1 | #3 | X | X | X | X | X | | | | | | | | | | |
| B-1 | Type #1 | #4 | | | X | X | | | X | X | X | | | X | X | X | |
| A-1 | Type #2 | #4 | | | X | X | | | | X | X | | | | X | X | |
| C-2 | Type #1 | N/A | X | | | | | X | | | | | | | | X | |
| B-n | Type #1 | N/A | X | | | X | | X | | | | | | | | | |
| A-1 | Type #3 | N/A | | | | | | | | | | X | | | | | |

FIG. 5

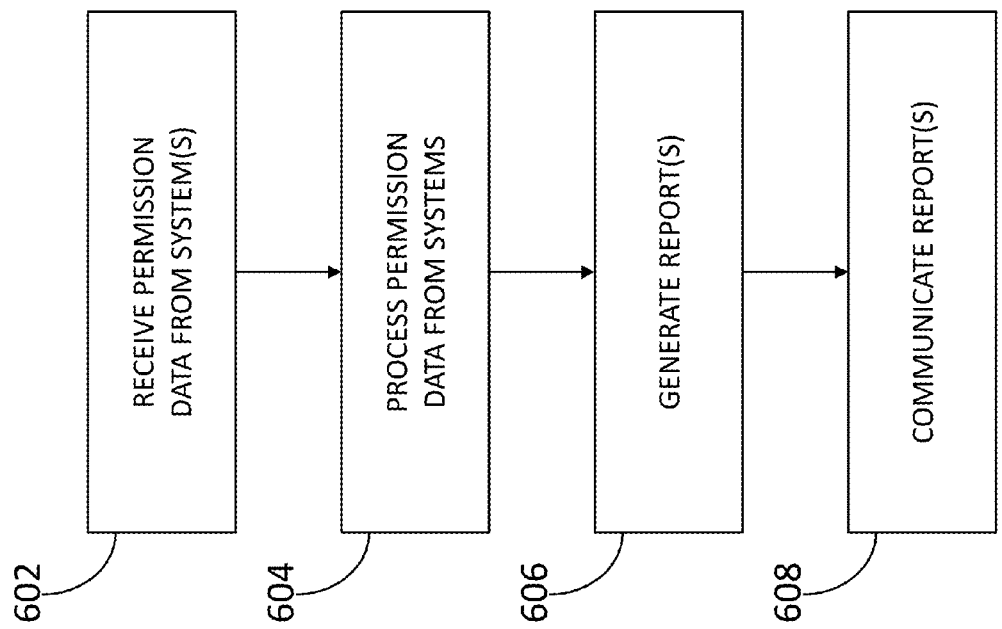

MATRIX ACCESS REVIEW

BACKGROUND

Many organizations utilize computing systems, for example, to maintain records, support internal and external communication and collaboration, analyze data regarding aspects of their operations, and the like. Such computing systems are often utilized by multiple users (e.g., employees, customers, and vendors of the organization, and the like), many of which may have different permissions (e.g., access rights, data modification rights, or the like) to various resources supported by the computing systems. Over time, as users' roles within the organization and/or relationship with the organization change, the permissions they are granted may deviate from what is appropriate or required for their current role within the organization and/or relationship with the organization. As a result, the permissions granted to the users of the computing systems may include more than what should granted (i.e., be over inclusive) and/or less than what should be granted (i.e., be under inclusive). These phenomena are exacerbated in large organizations, which often have immense user populations and utilize numerous computing systems, each of which may support multiple distinct resources. Accordingly, a need exists for matrix access review.

SUMMARY

The following presents a simplified summary in order to provide a basic understanding of some aspects of the disclosure. This summary is not an extensive overview of the disclosure. It is intended neither to identify key or critical elements of the disclosure nor to delineate the scope of the disclosure. The following summary merely presents some concepts of the disclosure in a simplified form as a prelude to the description below.

In accordance with one or more embodiments, a computing platform may receive, from a plurality of computing systems, data identifying permissions of a plurality of users to access one or more resources of the plurality of computing systems. The computing platform may identify, from amongst the plurality of users, a plurality of groups of users. The computing platform may identify, from amongst the permissions, a plurality of sets of permissions. Each set of permissions may include permissions shared by each user of a group of users of the plurality of groups of users. The computing platform may generate a graphical depiction of the plurality of groups of users and the plurality of sets of permissions. The graphical depiction may graphically depict, for each group of the plurality of groups, one or more sets of permissions, of the plurality of sets of permissions, shared by each user of the group.

In some embodiments, the computing platform may, for each computing system of the plurality of computing systems, generate a request for data identifying permissions of the plurality of users to access one or more resources of the computing system, and may communicate to the computing system, the request for the data identifying the permissions of the plurality of users to access the resource(s) of the computing system.

In some embodiments, the graphical depiction may comprise a first plurality of graphical elements and a second plurality of graphical elements. Each graphical element of the first plurality of graphical elements may be parallel to each other graphical element of the first plurality of graphical elements. Each graphical element of the first plurality of graphical elements may be orthogonal to each graphical element of the second plurality of graphical elements. In such embodiments, each graphical element of the first plurality of graphical elements may correspond to a user of the plurality of users, and each graphical element of the second plurality of graphical elements may correspond to a resource of a computing system of the plurality of computing systems and a permission type of the resource. The graphical depiction may further comprise a plurality of cells. Each cell of the plurality of cells may correspond to an intersection of a graphical element of the first plurality of graphical elements and a graphical element of the second plurality of graphical elements.

In some embodiments, each cell of the plurality of cells may correspond to a particular user of the plurality of users, a particular resource of a particular computing system of the plurality of computing systems, and a particular permission type of the particular resource. In such embodiments, each cell of the plurality of cells may graphically depict whether the data identifying the permissions of the plurality of users indicates that the particular user has the particular permission type of the particular resource. In some embodiments, the plurality of cells may include a plurality of sets of adjoining cells. Each set of adjoining cells of the plurality of sets of adjoining cells may include cells that adjoin at least one other cell of the set of adjoining cells and correspond to a member of a particular group of the plurality of groups of users. Additionally or alternatively, each set of adjoining cells of the plurality of sets of adjoining cells may correspond to a set of permissions of the plurality of sets of permissions and may graphically depict that the data identifying the permissions of the plurality of users indicates that each member of the particular group shares the set of permissions.

In some embodiments, the computing platform may generate data comprising the graphical depiction and may communicate, to a user device, the data comprising the graphical depiction. The user device may receive the data comprising the graphical depiction and may utilize the data comprising the graphical depiction to render the graphical depiction for display.

In some embodiments, the plurality of users may be associated with an organization. In such embodiments, the computing platform may identify a plurality of managers within the organization and, for each group of the plurality of groups, a manager of the group. In such embodiments, for each group the plurality of groups, the graphical depiction may include a graphical element corresponding to the manager of the group. The graphical element corresponding to the manager of the group may identify the manager of the group, identify each user of the group, and/or, for each set of permissions of the one or more sets of permissions, graphically depict that permissions in the set of permissions are shared by each user of the group.

In some embodiments, the computing platform may generate a graphical depiction for a first group of the plurality of groups. The graphical depiction for the first group may: identify a manager of the first group, identify each user of the first group, and/or graphically depict one or more sets of permissions, of the plurality of sets of permissions, shared by each user of the first group. The computing platform may generate data comprising the graphical depiction for the first group, identify a user device associated with the manager of the first group, and communicate the data comprising the graphical depiction for the first group to the user device associated with the manager of the first group.

In some embodiments, the computing platform may generate a graphical depiction for a second group of the plurality of groups. The second group may comprise different users than the first group. The graphical depiction for the second group may: identify a manager of the second group, fail to identify the manager of the first group, identify each user of the second group, fail to identify one or more members of the first group, graphically depict one or more sets of permissions, of the plurality of sets of permissions, shared by each user of the second group, and/or fail to graphically depict at least one of the one or more sets of permissions shared by each user of the first group. The computing platform may generate data comprising the graphical depiction for the second group, identify a user device associated with the manager of the second group, and communicate the data comprising the graphical depiction for the second group to the user device associated with the manager of the second group.

In some embodiments, the computing platform may generate a graphical depiction for a third group of the plurality of groups. The third group may comprise each user of the first group, each user of the second group, and/or a plurality of other users of the plurality of users. Each user of the plurality of other users may be a user that is in neither the first group nor the second group. The graphical depiction for the third group may: identify the manager of the first group, identify the manager of the second group, identify a manager of the third group, identify each user of the first group, identify each user of the second group, identify each user of the plurality of other users, graphically depict the one or more sets of permissions shared by each user of the first group, graphically depict the one or more sets of permissions shared by each user of the second group, and/or graphically depict one or more sets of permissions, of the plurality of sets of permissions, shared by each user of the plurality of other users. The computing platform may generate data comprising the graphical depiction for the third group, identify a user device associated with the manager of the third group, and communicate the data comprising the graphical depiction for the third group to the user device associated with the manager of the third group.

Other details and features will be described in the sections that follow.

BRIEF DESCRIPTION OF THE DRAWINGS

The present disclosure is pointed out with particularity in the appended claims. Features of the disclosure will become more apparent upon a review of this disclosure in its entirety, including the drawing figures provided herewith.

Some features herein are illustrated by way of example, and not by way of limitation, in the figures of the accompanying drawings, in which like reference numerals refer to similar elements, and wherein:

FIG. 5 depicts an illustrative graphical depiction in accordance with one or more example embodiments; and FIG. 6 depicts an illustrative method in accordance with one or more example embodiments.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Figure 1:
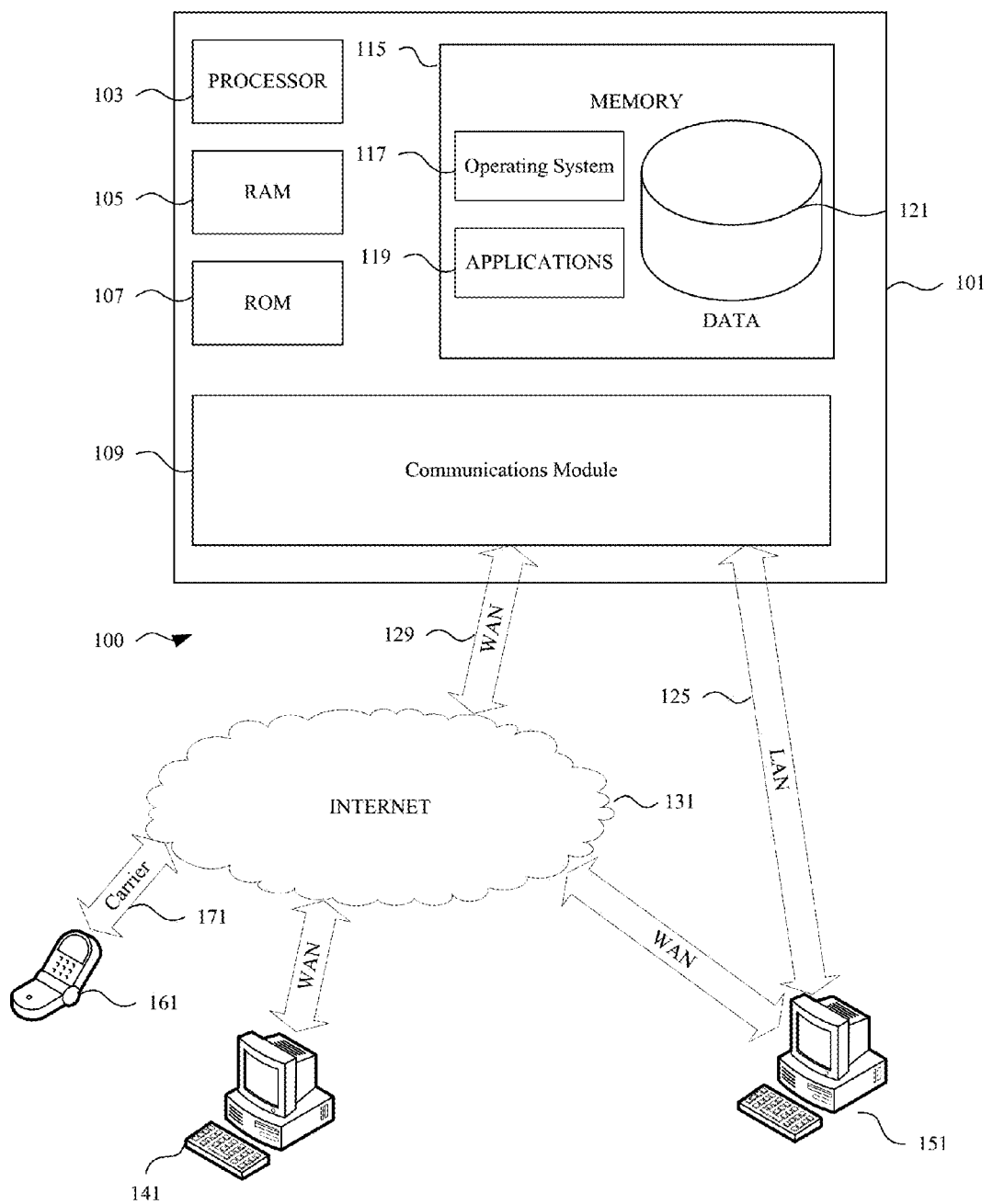
FIG. 1 depicts an illustrative operating environment in which various aspects of the present disclosure may be implemented in accordance with one or more example embodiments.

FIG. 1 depicts an illustrative operating environment in which various aspects of the present disclosure may be implemented in accordance with one or more example embodiments. Referring to FIG. 1, computing system environment 100 may be used according to one or more illustrative embodiments. Computing system environment 100 is only one example of a suitable computing environment and is not intended to suggest any limitation as to the scope of use or functionality contained in the disclosure. Computing system environment 100 should not be interpreted as having any dependency or requirement relating to any one or combination of components shown in illustrative computing system environment 100.

Computing system environment 100 may include computing device 101 having processor 103 for controlling overall operation of computing device 101 and its associated components, including random-access memory (RAM) 105, read-only memory (ROM) 107, communications module 109, and memory 115. Computing device 101 may include a variety of computer readable media. Computer readable media may be any available media that may be accessed by computing device 101, may be non-transitory, and may include volatile and nonvolatile, removable and non-removable media implemented in any method or technology for storage of information such as computer-readable instructions, object code, data structures, program modules, or other data. Examples of computer readable media may include random access memory (RAM), read only memory (ROM), electronically erasable programmable read only memory (EEPROM), flash memory or other memory technology, compact disk read-only memory (CD-ROM), digital versatile disks (DVD) or other optical disk storage, magnetic cassettes, magnetic tape, magnetic disk storage or other magnetic storage devices, or any other medium that can be used to store the desired information and that can be accessed by computing device 101.

Although not required, various aspects described herein may be embodied as a method, a data processing system, or as a computer-readable medium storing computer-executable instructions. For example, a computer-readable medium storing instructions to cause a processor to perform steps of a method in accordance with aspects of the disclosed embodiments is contemplated. For example, aspects of the method steps disclosed herein may be executed on a processor on computing device 101. Such a processor may execute computer-executable instructions stored on a computer-readable medium.

Software may be stored within memory 115 and/or storage to provide instructions to processor 103 for enabling computing device 101 to perform various functions. For example, memory 115 may store software used by computing device 101, such as operating system 117, application programs 119, and associated database 121. Also, some or all of the computer executable instructions for computing device 101 may be embodied in hardware or firmware. Although not shown, RAM 105 may include one or more applications representing the application data stored in RAM 105 while computing device 101 is on and corresponding software applications (e.g., software tasks), are running on computing device 101.

Communications module 109 may include a microphone, keypad, touch screen, and/or stylus through which a user of computing device 101 may provide input, and may also include one or more of a speaker for providing audio output and a video display device for providing textual, audiovisual and/or graphical output. Computing system environment 100 may also include optical scanners (not shown). Exemplary usages include scanning and converting paper documents, e.g., correspondence, receipts, and the like, to digital files.

Computing device 101 may operate in a networked environment supporting connections to one or more remote computing devices, such as computing devices 141, 151, and 161. Computing devices 141, 151, and 161 may be personal computing devices or servers that include any or all of the elements described above relative to computing device 101. Computing device 161 may be a mobile device (e.g., smart phone) communicating over wireless carrier channel 171.

The network connections depicted in FIG. 1 may include local area network (LAN) 125 and wide area network (WAN) 129, as well as other networks. When used in a LAN networking environment, computing device 101 may be connected to LAN 125 through a network interface or adapter in communications module 109. When used in a WAN networking environment, computing device 101 may include a modem in communications module 109 or other means for establishing communications over WAN 129, such as Internet 131 or other type of computer network. The network connections shown are illustrative and other means of establishing a communications link between the computing devices may be used. Various well-known protocols such as transmission control protocol/Internet protocol (TCP/IP), Ethernet, file transfer protocol (FTP), hypertext transfer protocol (HTTP) and the like may be used, and the system can be operated in a client-server configuration to permit a user to retrieve web pages from a web-based server. Any of various conventional web browsers can be used to display and manipulate data on web pages.

The disclosure is operational with numerous other general purpose or special purpose computing system environments or configurations. Examples of well-known computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like.

Figure 2:
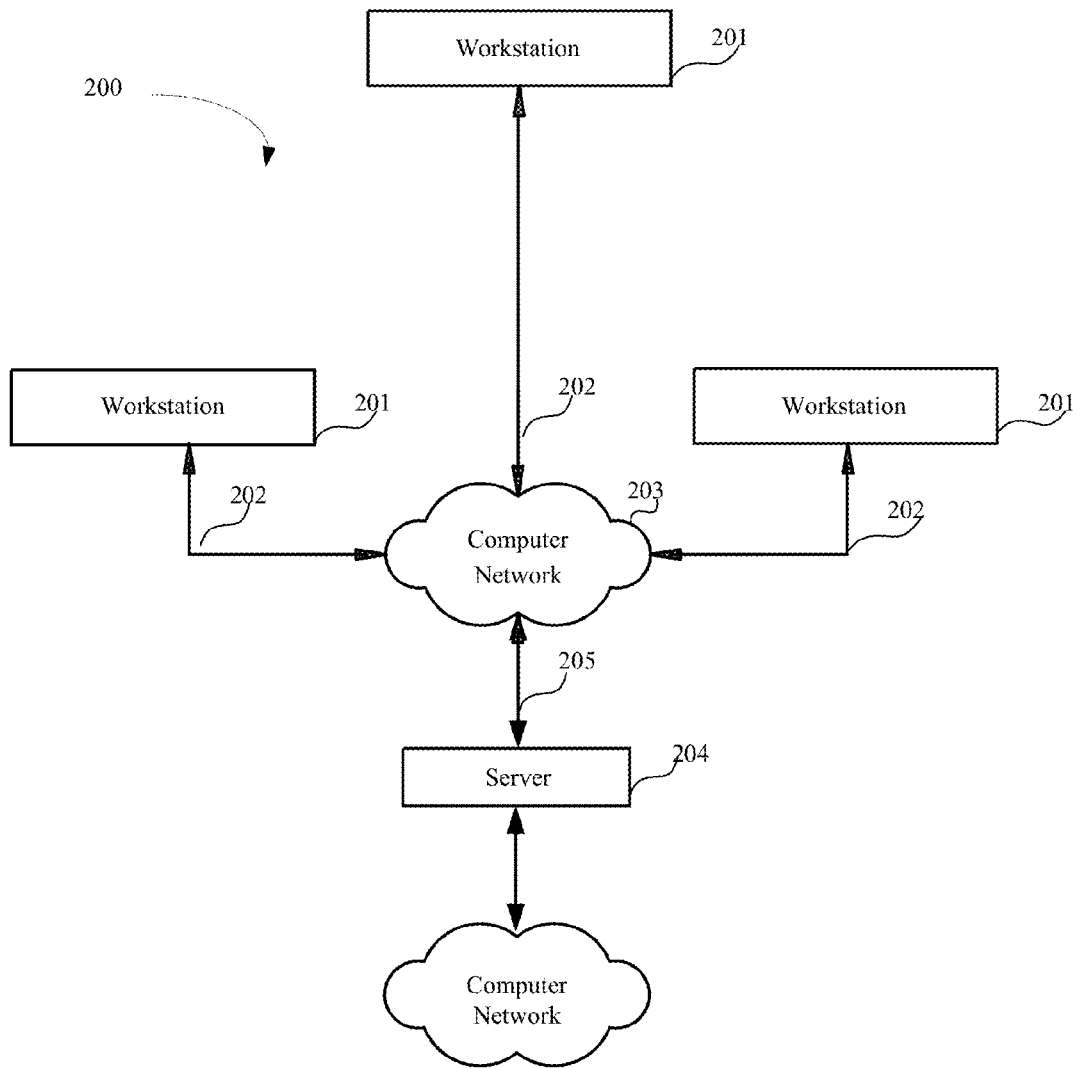
FIG. 2 depicts an illustrative block diagram of workstations and servers that may be used to implement the processes and functions of certain aspects of the present disclosure in accordance with one or more example embodiments.

FIG. 2 depicts an illustrative block diagram of workstations and servers that may be used to implement the processes and functions of certain aspects of the present disclosure in accordance with one or more example embodiments. Referring to FIG. 2, illustrative system 200 may be used for implementing example embodiments according to the present disclosure. As illustrated, system 200 may include one or more workstation computers 201. Workstation 201 may be, for example, a desktop computer, a smartphone, a wireless device, a tablet computer, a laptop computer, and the like. Workstations 201 may be local or remote, and may be connected by one of communications links 202 to computer network 203 that is linked via communications link 205 to server 204. In system 200, server 204 may be any suitable server, processor, computer, or data processing device, or combination of the same. Server 204 may be used to process the instructions received from, and the transactions entered into by, one or more participants.

Computer network 203 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 202 and 205 may be any communications links suitable for communicating between workstations 201 and server 204, such as network links, dial-up links, wireless links, hard-wired links, as well as network types developed in the future, and the like.

Figure 3:
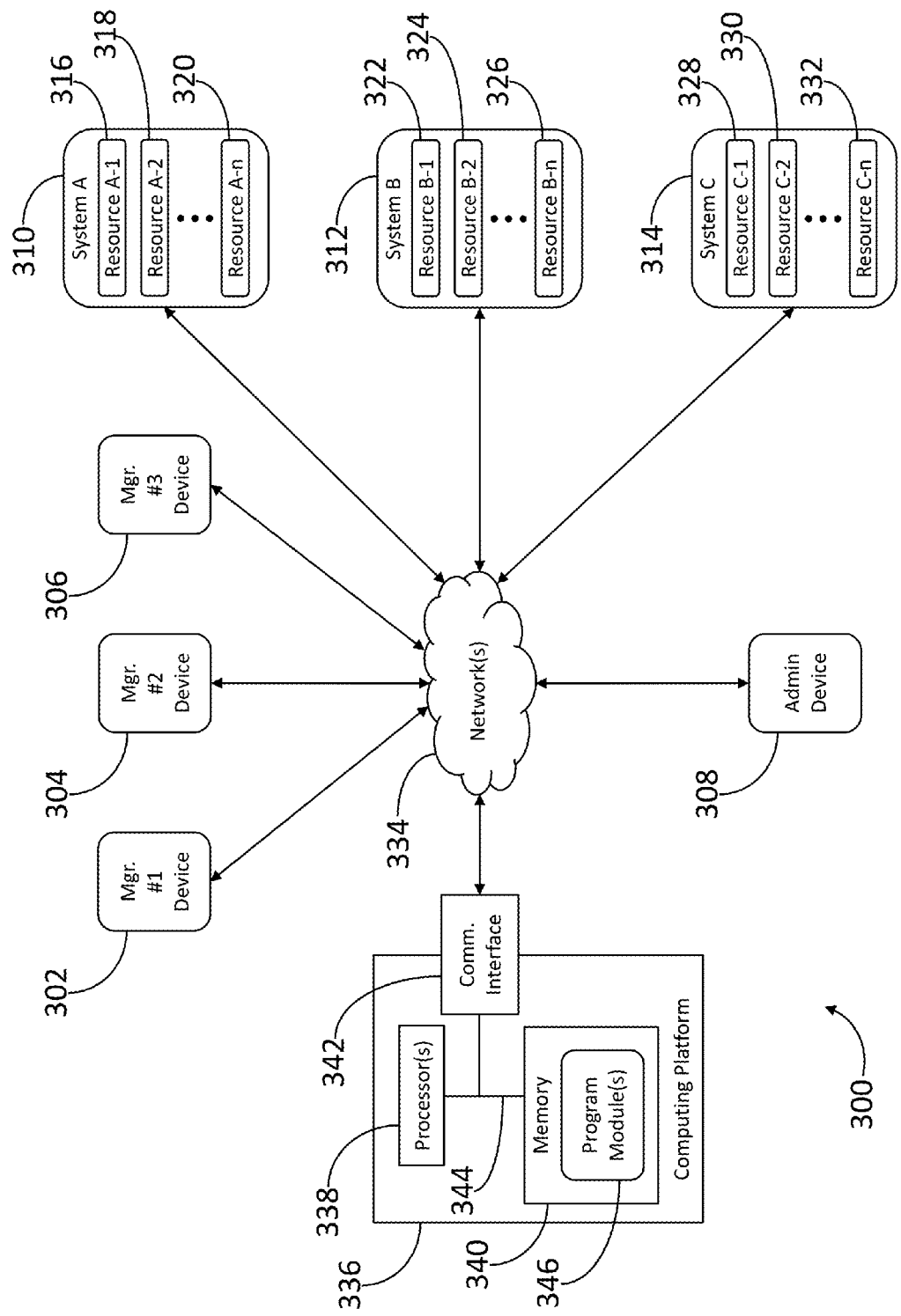
FIG. 3 depicts an illustrative computing environment in accordance with one or more example embodiments.

FIG. 3 depicts an illustrative computing environment in accordance with one or more example embodiments. Referring to FIG. 3, computing environment 300 may be associated with an organization (e.g., a corporation, university, government entity, financial institution, or the like) and may include one or more computing devices. For example, computing environment 300 may include manager device 302, manager device 304, manager device 306, and administrator device 308. Manager device 302, manager device 304, manager device 306, and/or administrator device 308 may comprise one or more of any type of computing device (e.g., desktop computer, laptop computer, tablet computer, smart phone, server, server blade, mainframe, virtual machine, or the like) configured to perform one or more of the functions described herein. Computing environment 300 may also include one or more computing systems. For example, computing environment 300 may include computing system 310, computing system 312, and computing system 314. Computing system 310, computing system 312, and/or computing system 314 may include one or more of any type of computing device (e.g., desktop computer, laptop computer, tablet computer, smart phone, server, server blade, mainframe, virtual machine, or the like) configured to perform one or more of the functions described herein. Computing system 310, computing system 312, and/or computing system 314 (e.g., one or more of the computing device(s) therein) may support one or more resources of the organization (e.g., databases, business applications, communication applications, financial management applications, file access or sharing systems, or the like). For example, computing system 310 may support resource 316, resource 318, and resource 320. Similarly, computing system 312 may support resource 322, resource 324, and resource 326, and computing system 314 may support resource 328, resource 330, and resource 332. Computing environment 300 may also include one or more networks. For example, computing environment 300 may include network(s) 334, which may include one or more sub-networks (e.g., LANs, WANs, VPNs, or the like) and may interconnect one or more of manager device 302, manager device 304, manager device 306, administrator device 308, computing system 310, computing system 312, or computing system 314.

Computing environment 300 may also include one or more computing platforms. For example, computing environment 300 may include computing platform 336. Computing platform 336 may include one or more of any type of computing device (e.g., desktop computer, laptop computer, tablet computer, smart phone, server, server blade, mainframe, virtual machine, or the like) configured to perform one or more of the functions described herein. In some embodiments, computing platform 336 may include one or more of manager device 302, manager device 304, manager device 306, administrator device 308, computing system 310, computing system 312, or computing system 314. Computing platform 336 may include one or more processor(s) 338, memory 340, communication interface 342, and/or data bus 344. Data bus 344 may interconnect processor(s) 338, memory 340, and/or communication interface 342. Communication interface 342 may be a network interface configured to support communication between computing platform 336 and network(s) 334 (or one or more subnetworks thereof). Memory 340 may include one or more program modules comprising instructions that when executed by processor(s) 338 cause computing platform 336 to perform one or more functions described herein. For example, memory 340 may include program module(s) 346, which may comprise instructions that when executed by processor(s) 338 cause computing platform 336 to perform one or more functions described herein.

Figure 4:
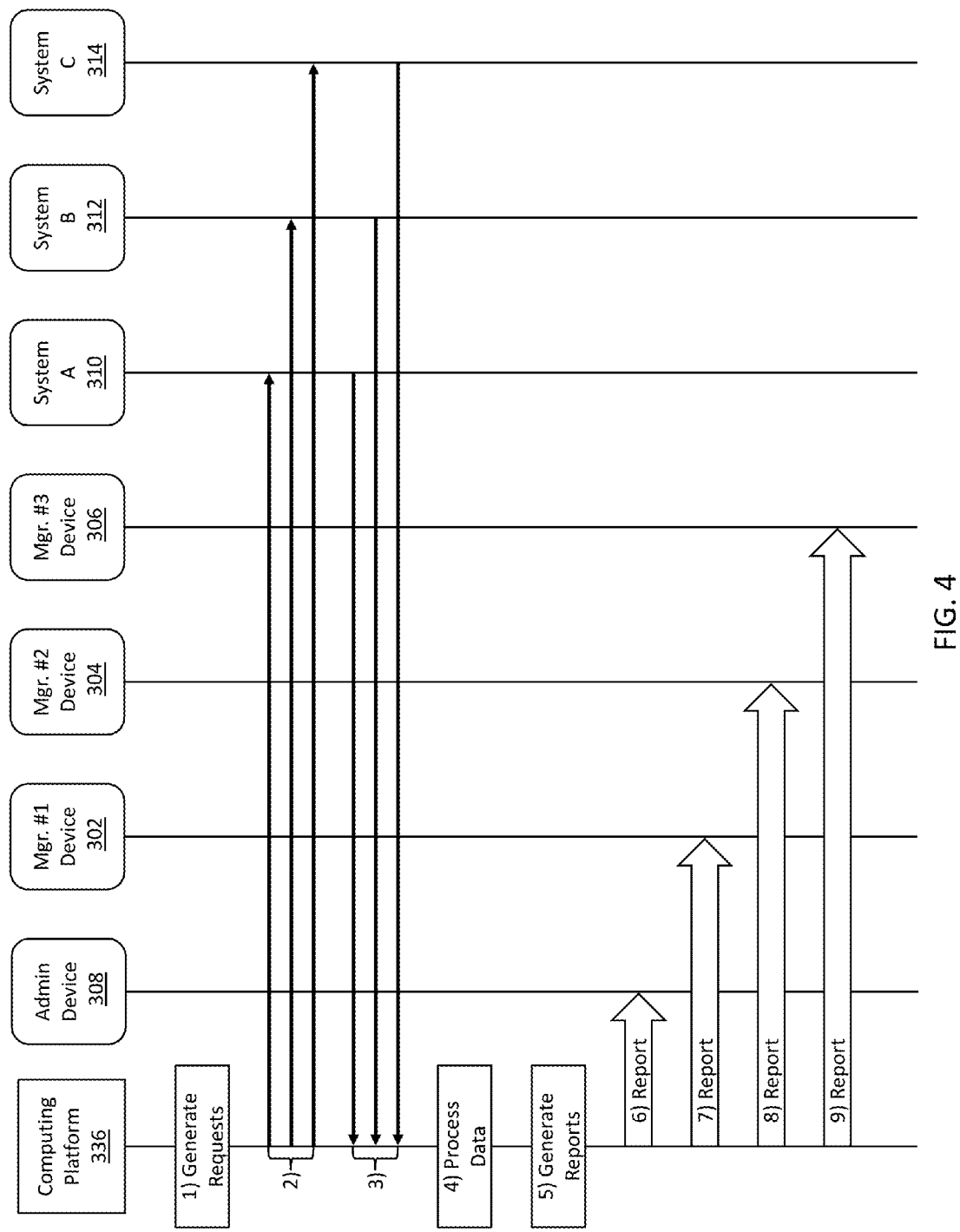
FIG. 4 depicts an illustrative event sequence in accordance with one or more example embodiments.

FIG. 4 depicts an illustrative event sequence in accordance with one or more example embodiments. Referring to FIG. 4, at step 1, computing platform 336 may generate one or more requests for data identifying permissions of one or more users of the organization associated with computing environment 300 to access one or more resources of the organization. For example, computing platform 336 may generate one or more requests for data identifying permissions of user(s) (e.g., manager 1, manager 2, manager 3, user 1, user 2, user 3, user 4, user 5, user 6, user 7, user 8, user 9, user 10, user 11, and/or user 12) to access resource 316, resource 318, and/or resource 320. Similarly, computing platform 336 may generate one or more requests for data identifying permissions of one or more of the user(s) to access resource 322, resource 324, and/or resource 326, and/or computing platform 336 may generate one or more requests for data identifying permissions of one or more of the user(s) to access resource 328, resource 330, and/or resource 332. At step 2, computing platform 336 may communicate the request(s) for the data identifying the permissions of the user(s) to access the resource(s) to one or more computing systems that support the resource(s). For example, computing platform 336 may communicate (e.g., via communication interface 342) the request(s) for the data identifying the permissions of the user(s) to access resource 316, resource 318, and/or resource 320 to computing system 310. Similarly, computing platform 336 may communicate (e.g., via communication interface 342) the request(s) for the data identifying the permissions of the user(s) to access resource 322, resource 324, and/or resource 326 to computing system 312, and/or computing platform 336 may communicate (e.g., via communication interface 342) the request(s) for the data identifying the permissions of the user(s) to access resource 328, resource 330, and/or resource 332 to computing system 314. Responsive to receiving the request(s), the computing system(s) may identify the permissions of the user(s) to access the resource(s), may generate the data identifying the permissions of the user(s) to access the resource(s), and, at step 3, may communicate the data identifying the permissions of the user(s) to access the resource(s) to computing platform 336, which may receive the data. For example, computing platform 336 may receive (e.g., via communication interface 342), from computing system 310, the data identifying the permissions of the user(s) to access resource 316, resource 318, and/or resource 320. Similarly, computing platform 336 may receive (e.g., via communication interface 342), from computing system 312, the data identifying the permissions of the user(s) to access resource 322, resource 324, and/or resource 326, and/or computing platform 336 may receive (e.g., via communication interface 342), from computing system 314, the data identifying the permissions of the user(s) to access resource 328, resource 330, and/or resource 332.

At step 4, computing platform 336 may process the data identifying the permissions of the user(s) to access the resource(s) of the organization supported by the computing system(s). In some embodiments, computing platform 336 may be configured to identify, from amongst the user(s), one or more groups of users. For example, computing platform 336 may identify a group of users associated with manager 1 (e.g., manager 1, user 1, user 2, user 3, and/or user 4). Similarly, computing platform 336 may identify a group of users associated with manager 2 (e.g., manager 2, user 5, user 6, user 7, and/or user 8), and/or computing platform 336 may identify a group of users associated with manager 3 (e.g., manager 3, user 9, user 10, user 11, and/or user 12). Computing platform 336 may also be configured to identify, from amongst the permissions, one or more sets of permissions that includes permissions shared by each user of a group. For example, computing platform 336 may identify a set of permissions comprising permission type 1 for resource 316 and permission type 1 for resource 318, which includes permissions shared by a group comprising manager 1, user 1, user 2, user 3, and user 4, a group comprising manager 2, user 5, user 6, user 7, and user 8, and a group comprising manager 3, user 9, user 10, user 11, and user 12. Similarly, computing platform 336 may identify a set of permissions comprising permission type 1 for resource 324, permission type 1 for resource 328, and permission type 1 for resource 320, which includes permissions shared by a group comprising user 9, user 11, and user 12, computing platform 336 may identify a set of permissions comprising permission type 2 for resource 330 and permission type 1 for resource 332, which includes permissions shared by a group comprising manager 1, user 1, user 2, and user 4, and/or computing platform 336 may identify a set of permissions comprising permission type 1 for resource 322 and permission type 2 for resource 316, which includes permissions shared by a group comprising user 2 and user 3, a group comprising user 6 and user 7, and a group comprising user 10 and user 11.

At step 5, computing platform 336 may generate one or more reports (e.g., for an administrator of computing environment 300, manager 1, manager 2, manager 3, or the like) comprising a graphical depiction of the identified group(s) and set(s) of permissions (e.g., a depiction graphically depicting, for each of the group(s), one or more sets of permissions shared by each user of the group). FIG. 5 depicts an illustrative graphical depiction in accordance with one or more example embodiments. Referring to FIG. 5, the graphical depiction may comprise a first plurality of graphical elements, wherein each graphical element corresponds to a user. For example, the graphical depiction may comprise a plurality of columns, wherein each column corresponds to a user (e.g., manager 1, manager 2, manager 3, user 1, user 2, user 3, user 4, user 5, user 6, user 7, user 8, user 9, user 10, user 11, and user 12). The graphical depiction may further comprise a second plurality of graphical elements, wherein each graphical element corresponds to a resource and/or a permission type of the resource. For example, the graphical depiction may comprise a plurality of rows, wherein each row corresponds to a resource and/or a permission type of the resource (e.g., resource 316/permission type 1, resource 318/permission type 1, resource 324/permission type 1, resource 328/permission type 1, resource 320/permission type 1, resource 330/permission type 2, resource 332/permission type 1, resource 322/permission type 1, resource 316/permission type 2, resource 330/permission type 1, resource 326/permission type 1, and resource 316/permission type 3). Each graphical element of the first plurality of graphical elements may be parallel to each other graphical element of the first plurality of graphical elements and orthogonal to each graphical element of the second plurality of graphical elements, and the intersection of a graphical element of the first plurality of graphical elements and a graphical element of the second plurality of graphical elements may create a cell, which may correspond to a user, a resource of a computing system, and/or a permission type of the resource and may graphically depict whether the user has the permission type of the particular resource. For example, the cell created by the intersection of the column corresponding to manager 1 and the row corresponding to resource 316 and permission type 1 may create a cell that graphically depicts that manager 1 has permission type 1 to resource 316. The plurality of cells formed by the intersection of the rows and the columns may include one or more sets of adjoining cells (e.g., sets of cells, wherein each cell within the set adjoins at least one other cell in the set), each of which may correspond to an identified group and/or a set of permissions shared by each member of the identified group. For example, the set of cells that includes the cell formed by the intersection of the column corresponding to user 2 and the row corresponding to resource 322 and permission type 1, the cell formed by the intersection of the column corresponding to user 3 and the row corresponding to resource 322 and permission type 1, the cell formed by the intersection of the column corresponding to user 2 and the row corresponding to resource 316 and permission type 2, and the cell formed by the intersection of the column corresponding to user 3 and the row corresponding to resource 316 and permission type 2 may form a set of adjoining cells that graphically depicts a group comprising user 2 and user 3 and that graphically depicts that user 2 and user 3 each have permission type 1 to resource 322 and permission type 2 to resource 316.

It will be appreciated that such a graphical depiction may be utilized to readily identify groups of users that share permissions. For example, the graphical depiction may be utilized to readily identify that the group comprising manager 1, user 1, user 2, user 3, and user 4 shares permission type 1 to resource 316 and permission type 1 to resource 318, as well as that these permissions are also shared by the group comprising manager 2, user 5, user 6, user 7, and user 8 and the group comprising manager 3, user 9, user 10, user 11, and user 12. Similarly, the graphical depiction may be utilized to readily identify that the group comprising user 9, user 11, and user 12 shares permission type 1 to resource 324, permission type 1 to resource 328, and permission type 1 to resource 320, or that the group comprising user 2 and user 3 shares permission type 1 to resource 322 and permission type 2 to resource 316, as well as that these permissions are also shared by the group comprising user 6 and user 7 and the group comprising user 10 and user 11.

It will also be appreciated that such a graphical depiction may be utilized to readily identify permissions that are not currently granted but probably should be. For example, the graphical depiction shows that each member of the group comprising manager 1, user 1, user 2, and user 4, shares permission type 1 to resource 332, but that user 3 does not have this permission. In some embodiments, the graphical depiction may include labels corresponding to one or more sets of shared permissions. For example, the set of permissions that includes permission type 1 to resource 316 and permission type 1 to resource 318 may be labeled task 1. Similarly, the set of permissions that includes permission type 1 to resource 324, permission type 1 to resource 328, and permission type 1 to resource 320 may be labeled task 2, the set of permissions that includes permission type 2 to resource 330 and permission type 1 to resource 332 may be labeled task 3, and the set of permissions that includes permission type 1 to resource 322 and permission type 2 to resource 316 may be labeled task 4. In some embodiments, the graphical depiction may graphically distinguish (e.g., via shading, color coding, or the like) cells (or a portion thereof) associated with a particular task from other cells included in the graphical depiction. For example, the graphical depiction may distinguish the cells associated with task 3 based on a determination that permission type 2 to resource 330 and permission type 1 to resource 332 are uniquely associated with task 3 (e.g., associated with task 3 but not any of the other depicted tasks). It will further be appreciated, that such a graphical depiction may be utilized to readily identify one or more roles associated with the depicted users and/or permissions. For example, a role including task 1 and task 3 may be associated with manager 1, user 1, and user 4. Similarly, a role including task 1, task 3, and task 4 may be associated with user 2, a role including task 1 and task 4 may be associated with user 3, user 6, user 7, and user 10, a role including task 1 and task 2 may be associated with user 9 and user 12, and/or a role including task 1, task 2, and task 4 may be associated with user 11. In some embodiments, the graphical depiction may graphically distinguish (e.g., via shading, color coding, or the like) cells (or a portion thereof) associated with a particular role from other cells included in the graphical depiction. For example, each of the cells in the column corresponding to user 3, the column corresponding to user 6, the column corresponding to user 7, and the column corresponding to user 10 may be altered (not illustrated) to graphically depict the association of user 3, user 6, user 7, and user 10 with the role including task 1 and task 4. In some embodiments, the graphical depiction may graphically distinguish (e.g., via a predetermined symbol, shading, color coding, or the like) cells (or a portion thereof) associated with a grant of one or more permissions that are included in an identified role and/or task, but where the grant(s) are distinguishable from the identified task and/or role. For example, the graphical depiction may graphically distinguish the grant to user 10 of permission type 1 to resource 324 and permission type 1 to resource 320 from the grants of these same permissions to user 9, user 11, and user 12 (e.g., based on a determination that user 9, user 11, and user 12 are also granted permission type 1 to resource 328, which is a component of task 2).

It will further be appreciated that such a graphical depiction may be utilized to readily identify permissions that are currently granted but probably should not be. For example, one can readily identify from the graphical depiction that user 5 is granted permission type 1 to resource 328 and that this grant to user 5 does not correspond to similar grants (e.g., the grant of permission type 1 to resource 328 to user 9, user 11, and user 12, which also have permission type 1 to resource 324 and permission type 1 to resource 320). In some embodiments, the graphical depiction may include cells that do not correspond to an identified set of shared permissions and/or an identified group. For example, the graphical depiction may include cells that correspond to permission type 1 to resource 330, permission type 1 to resource 326, and permission type 3 to resource 316. It will be appreciated that these cells may also be utilized to readily identify permissions that are granted that probably should not be. For example, these cells may depict that in addition to manager 1, manager 2, and manager 3, user 3 is currently granted permission type 1 to resource 326.

Returning to FIG. 4, at step 6, computing platform 336 may identify administrator device 308 as being associated with an administrator of computing environment 300, and may communicate (e.g., via communication interface 342) a report (e.g., data comprising the graphical depiction) to administrator device 308, which may receive the report and may render the graphical depiction for display. At step 7, computing platform 336 may identify manager device 302 as being associated with manager 1, and may communicate (e.g., via communication interface 342) a report (e.g., data comprising the graphical depiction) to manager device 302, which may receive the report and may render the graphical depiction for display. At step 8, computing platform 336 may identify manager device 304 as being associated with manager 2, and may communicate (e.g., via communication interface 342) a report (e.g., data comprising the portion of the graphical depiction pertinent to manager 2 (e.g., only those cells corresponding to manager 2, user 5, user 6, user 7, and user 8)) to manager device 304, which may receive the report and may render the graphical depiction (e.g., the portion of the graphical depiction pertinent to manager 2) for display. At step 9, computing platform 336 may identify manager device 306 as being associated with manager 3, and may communicate (e.g., via communication interface 342) a report (e.g., data comprising the portion of the graphical depiction pertinent to manager 3 (e.g., only those cells corresponding to manager 3, user 9, user 10, user 11, and user 12)) to manager device 306, which may receive the report and may render the graphical depiction (e.g., the portion of the graphical depiction pertinent to manager 3) for display.

FIG. 6 depicts an illustrative method in accordance with one or more example embodiments. Referring to FIG. 6, at step 602, data identifying permissions of a plurality of users to access one or more resources of a plurality of computing systems may be received. For example, computing platform 336 may receive data identifying permissions of users (e.g., manager 1, manager 2, manager 3, user 1, user 2, user 3, user 4, user 5, user 6, user 7, user 8, user 9, user 10, user 11, and/or user 12) to access resources (e.g., resource 316, resource 318, resource 320, resource 322, resource 324, resource 326, resource 328, resource 330, and/or resource 332) from computing system 310, computing system 312, and/or computing system 314. At step 604, the data may be processed to identify a plurality of groups of users and a plurality of sets of permissions, wherein each set of permissions comprises permissions shared by each user of a group of users. For example, computing platform 336 may process the data received from computing system 310, computing system 312, and/or computing system 314 and may identify a group comprising manager 1, user 1, user 2, user 3, and user 4, and a group comprising manager 1, user 1, user 2, and user 4, and may identify a set of permissions comprising permission type 1 to resource 316 and permission type 1 to resource 318 (e.g., permissions shared by manager 1, user 1, user 2, user 3, and user 4), and a set of permissions comprising permission type 2 to resource 330 and permission type 1 to resource 332 (e.g., permissions shared by manager 1, user 1, user 2, and user 4). At step 606, one or more reports comprising a graphical depiction of the plurality of groups and the plurality of sets of permissions may be generated. For example, computing platform 336 may generate a report comprising a graphical depiction similar to the graphical depiction illustrated in FIG. 5. At step 608, the report(s) may be communicated to one or more computing devices. For example, computing platform 336 may communicate (e.g., via communication interface 342) the report to administrator device 308.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may comprise one or more non-transitory computer-readable media.

As described herein, the various methods and acts may be operative across one or more computing servers and one or more networks. The functionality may be distributed in any manner, or may be located in a single computing device (e.g., a server, a client computer, and the like).

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A method, comprising:
at a computing platform comprising at least one processor, a communication interface, and a memory:
receiving, via the communication interface and from a plurality of computing systems, data identifying permissions of a plurality of users to access one or more resources of the plurality of computing systems, wherein the plurality of users are associated with an organization;
identifying, by the at least one processor and from amongst the plurality of users, a plurality of groups of users;
identifying, by the at least one processor and from amongst the permissions, a plurality of sets of permissions, each set of permissions of the plurality of sets of permissions comprising permissions shared by each user of a group of users of the plurality of groups of users;
identifying, by the at least one processor, a plurality of managers within the organization;
identifying, by the at least one processor and for each group of the plurality of groups, a manager of the group, the manager of the group being different from one or more other users in the group; and
generating, by the at least one processor, a matrix access review report associated with the plurality of groups of users and the plurality of sets of permissions, the matrix access review report graphically depicting, for each group of the plurality of groups, one or more sets of permissions, of the plurality of sets of permissions, shared by each user of the group, wherein, for each group the plurality of groups, the matrix access review report comprises a graphical element corresponding to the manager of the group, wherein the graphical element corresponding to the manager of the group:
identifies the manager of the group;
identifies each user of the group; and
for each set of permissions of the one or more sets of permissions, graphically depicts that permissions in the set of permissions are shared by each user of the group,
wherein generating the matrix access review report comprises:
generating, by the at least one processor, a first portion of the matrix access review report for a first group of the plurality of groups, the first portion of the matrix access review report for the first group: identifying a manager of the first group, identifying each user of the first group, and graphically depicting one or more sets of permissions, of the plurality of sets of permissions, shared by each user of the first group;
identifying, by the at least one processor, a user device associated with the manager of the first group;
communicating, via the communication interface and to the user device associated with the manager of the first group, the first portion of the matrix access review report for the first group;
generating, by the at least one processor, a second portion of the matrix access review report for a second group of the plurality of groups, the second group comprising different users than the first group, the second portion of the matrix access review report for the second group: identifying a manager of the second group, failing to identify the manager of the first group, identifying each user of the second group, failing to identify one or more members of the first group, graphically depicting one or more sets of permissions, of the plurality of sets of permissions, shared by each user of the second group, and failing to graphically depict at least one of the one or more sets of permissions shared by each user of the first group;
identifying, by the at least one processor, a user device associated with the manager of the second group;
communicating, via the communication interface and to the user device associated with the manager of the second group, the second portion of the matrix access review report for the second group;
generating, by the at least one processor, a third portion of the matrix access review report for a third group of the plurality of groups, the third group comprising each user of the first group, each user of the second group, and a plurality of other users of the plurality of users, each user of the plurality of other users being a user that is in neither the first group nor the second group, the third portion of the matrix access review report for the third group: identifying the manager of the first group, identifying the manager of the second group, identifying a manager of the third group, identifying each user of the first group, identifying each user of the second group, identifying each user of the plurality of other users, graphically depicting the one or more sets of permissions shared by each user of the first group, graphically depicting the one or more sets of permissions shared by each user of the second group, and graphically depicting one or more sets of permissions, of the plurality of sets of permissions, shared by each user of the plurality of other users;
identifying, by the at least one processor, a user device associated with the manager of the third group; and
communicating, via the communication interface and to the user device associated with the manager of the third group, the third portion of the matrix access review report for the third group.

2. The method of claim 1, comprising:
communicating, via the communication interface and to a user device, the matrix access review report.

3. The method of claim 2, comprising:
receiving, by the user device, the matrix access review report; and
utilizing, by the user device, the matrix access review report received from the computing platform to render the matrix access review report for display.

4. The method of claim 1, comprising, for each computing system of the plurality of computing systems:
generating, by the at least one processor, a request for data identifying permissions of the plurality of users to access one or more resources of the computing system; and
communicating, via the communication interface and to the computing system, the request for the data identifying the permissions of the plurality of users to access the one or more resources of the computing system.

5. The method of claim 1, wherein the matrix access review report comprises a first plurality of graphical elements and a second plurality of graphical elements, each graphical element of the first plurality of graphical elements being parallel to each other graphical element of the first plurality of graphical elements, and each graphical element of the first plurality of graphical elements being orthogonal to each graphical element of the second plurality of graphical elements.

6. The method of claim 5, wherein each graphical element of the first plurality of graphical elements corresponds to a user of the plurality of users, and wherein each graphical element of the second plurality of graphical elements corresponds to a resource of a computing system of the plurality of computing systems and a permission type of the resource.

7. The method of claim 6, wherein the matrix access review report comprises a plurality of cells, each cell of the plurality of cells corresponding to an intersection of a graphical element of the first plurality of graphical elements and a graphical element of the second plurality of graphical elements.

8. The method of claim 7, wherein each cell of the plurality of cells:
 corresponds to a user of the plurality of users, a resource of a computing system of the plurality of computing systems, and a permission type of the resource; and
 graphically depicts whether the data identifying the permissions of the plurality of users indicates that the user has the permission type of the resource.

9. The method of claim 8, wherein the plurality of cells comprises a plurality of sets of adjoining cells, each set of adjoining cells of the plurality of sets of adjoining cells comprising cells that adjoin at least one other cell of the set of adjoining cells and correspond to a member of a group of the plurality of groups of users, and wherein each set of adjoining cells of the plurality of sets of adjoining cells corresponds to a set of permissions of the plurality of sets of permissions and graphically depicts that the data identifying the permissions of the plurality of users indicates that each member of the group shares the set of permissions.

10. The method of claim 1, comprising:
 prior to receiving the data identifying the permissions of the plurality of users to access the one or more resources of the plurality of computing systems:
  generating, by the at least one processor, one or more requests for data identifying permissions of one or more users associated with a computing environment; and
  communicating, via the communication interface and to the plurality of computing systems, the one or more requests for the data identifying the permissions of the one or more users associated with the computing environment.

11. A computing platform, comprising:
 at least one processor;
 a communication interface; and
 a memory storing instructions that, when executed by the at least one processor, cause the computing platform to:
  receive, via the communication interface and from a plurality of computing systems, data identifying permissions of a plurality of users to access one or more resources of the plurality of computing systems, wherein the plurality of users are associated with an organization;
  identify, by the at least one processor and from amongst the plurality of users, a plurality of groups of users;
  identify, by the at least one processor and from amongst the permissions, a plurality of sets of permissions, each set of permissions of the plurality of sets of permissions comprising permissions shared by each user of a group of users of the plurality of groups of users;
  identify, by the at least one processor, a plurality of managers within the organization;
  identify, by the at least one processor and for each group of the plurality of groups, a manager of the group, the manager of the group being different from one or more other users in the group; and
  generate, by the at least one processor, a matrix access review report associated with the plurality of groups of users and the plurality of sets of permissions, the matrix access review report graphically depicting, for each group of the plurality of groups, one or more sets of permissions, of the plurality of sets of permissions, shared by each user of the group, wherein, for each group the plurality of groups, the matrix access review report comprises a graphical element corresponding to the manager of the group, wherein the graphical element corresponding to the manager of the group:
   identifies the manager of the group;
   identifies each user of the group; and
   for each set of permissions of the one or more sets of permissions, graphically depicts that permissions in the set of permissions are shared by each user of the group,
 wherein generating the matrix access review report comprises:
  generating, by the at least one processor, a first portion of the matrix access review report for a first group of the plurality of groups, the first portion of the matrix access review report for the first group: identifying a manager of the first group, identifying each user of the first group, and graphically depicting one or more sets of permissions, of the plurality of sets of permissions, shared by each user of the first group;
  identifying, by the at least one processor, a user device associated with the manager of the first group;
  communicating, via the communication interface and to the user device associated with the manager of the first group, the first portion of the matrix access review report for the first group;
  generating, by the at least one processor, a second portion of the matrix access review report for a second group of the plurality of groups, the second group comprising different users than the first group, the second portion of the matrix access review report for the second group: identifying a manager of the second group, failing to identify the manager of the first group, identifying each user of the second group, failing to identify one or more members of the first group, graphically depicting one or more sets of permissions, of the plurality of sets of permissions, shared by each user of the second group, and failing to graphically depict at least one of the one or more sets of permissions shared by each user of the first group;
  identifying, by the at least one processor, a user device associated with the manager of the second group;
  communicating, via the communication interface and to the user device associated with the manager of the second group, the second portion of the matrix access review report for the second group;
  generating, by the at least one processor, a third portion of the matrix access review report for a third group of the plurality of groups, the third group comprising each user of the first group, each user of the second group, and a plurality of other users of the plurality of users, each user of the plurality of other users being a user that is in neither the first group nor the second group, the third portion of the matrix access review report for the third group: identifying the manager of the first group, identifying the manager of the second group, identifying a manager of the third group, identifying each user of the first group, identifying each user of the second group, identifying each user of the plurality of other users, graphically depicting the one or more sets of permissions shared by each user of the first group, graphically depicting the one or more sets of permissions shared by each user of the second group, and graphically depicting one or more sets of permissions, of the plurality of sets of permissions, shared by each user of the plurality of other users;

identifying, by the at least one processor, a user device associated with the manager of the third group; and communicating, via the communication interface and to the user device associated with the manager of the third group, the third portion of the matrix access review report for the third group.

12. The computing platform of claim 11, wherein the memory stores additional instructions that, when executed by the at least one processor, cause the computing platform to:

communicate, via the communication interface and to a user device, the matrix access review report.

13. The computing platform of claim 11, wherein the memory stores additional instructions that, when executed by the at least one processor, cause the computing platform to, for each computing system of the plurality of computing systems:

generate, by the at least one processor, a request for data identifying permissions of the plurality of users to access one or more resources of the computing system; and communicate, via the communication interface and to the computing system, the request for the data identifying the permissions of the plurality of users to access the one or more resources of the computing system.

14. The computing platform of claim 11, wherein the matrix access review report comprises a first plurality of graphical elements and a second plurality of graphical elements, each graphical element of the first plurality of graphical elements being parallel to each other graphical element of the first plurality of graphical elements, and each graphical element of the first plurality of graphical elements being orthogonal to each graphical element of the second plurality of graphical elements.

15. The computing platform of claim 14, wherein each graphical element of the first plurality of graphical elements corresponds to a user of the plurality of users, and wherein each graphical element of the second plurality of graphical elements corresponds to a resource of a computing system of the plurality of computing systems and a permission type of the resource.

16. The computing platform of claim 15, wherein the matrix access review report comprises a plurality of cells, each cell of the plurality of cells corresponding to an intersection of a graphical element of the first plurality of graphical elements and a graphical element of the second plurality of graphical elements.

17. The computing platform of claim 16, wherein each cell of the plurality of cells:

corresponds to a user of the plurality of users, a resource of a computing system of the plurality of computing systems, and a permission type of the resource; and graphically depicts whether the data identifying the permissions of the plurality of users indicates that the user has the permission type of the resource.

18. The computing platform of claim 17, wherein the plurality of cells comprises a plurality of sets of adjoining cells, each set of adjoining cells of the plurality of sets of adjoining cells comprising cells that adjoin at least one other cell of the set of adjoining cells and correspond to a member of a group of the plurality of groups of users, and wherein each set of adjoining cells of the plurality of sets of adjoining cells corresponds to a set of permissions of the plurality of sets of permissions and graphically depicts that the data identifying the permissions of the plurality of users indicates that each member of the group shares the set of permissions.

\* \* \* \* \*